(12) United States Patent
Götzelmann et al.

(10) Patent No.: US 12,043,319 B2
(45) Date of Patent: Jul. 23, 2024

(54) VEHICLE DOOR AND PRODUCTION OF THE SAME

(71) Applicant: Magna Exteriors GmbH, Sailauf (DE)

(72) Inventors: Johannes Götzelmann, Altertheim (DE); Miguel Benitez, Mainhausen (DE)

(73) Assignee: Magna Exteriors GmbH, Sailauf (DE)

( * ) Notice: Subject to any disclaimer, the term of this patent is extended or adjusted under 35 U.S.C. 154(b) by 807 days.

(21) Appl. No.: 17/076,146

(22) Filed: Oct. 21, 2020

(65) Prior Publication Data

US 2021/0122429 A1 Apr. 29, 2021

(30) Foreign Application Priority Data

Oct. 25, 2019 (DE) .......................... 102019216518.4

(51) Int. Cl.
| | | |
|---|---|---|
| *B62D 29/00* | (2006.01) | |
| *B29C 45/14* | (2006.01) | |
| *B62D 27/02* | (2006.01) | |
| *B62D 65/06* | (2006.01) | |
| *B29K 705/00* | (2006.01) | |
| *B29L 31/30* | (2006.01) | |

(Continued)

(52) U.S. Cl.
CPC ...... *B62D 29/005* (2013.01); *B29C 45/14467* (2013.01); *B62D 27/02* (2013.01); *B62D 65/06* (2013.01); *B29K 2705/00* (2013.01); *B29L 2031/30* (2013.01); *B60J 5/10* (2013.01); *B62D 33/023* (2013.01)

(58) Field of Classification Search
CPC ...... B62D 29/005; B62D 27/02; B62D 65/06; B62D 33/023; B62D 29/043; B29C 45/14467; B29C 45/14311; B29C 45/14491; B29C 45/1418; B29C 45/14622; B29K 2705/00; B29L 2031/30; B60J 5/10; B60J 5/0437; B60J 5/0468; B60J 5/04; B60J 5/107
USPC .................. 296/146.5, 146.8, 146.6, 205
See application file for complete search history.

(56) References Cited

U.S. PATENT DOCUMENTS

| | | | | |
|---|---|---|---|---|
| 6,015,182 A | * | 1/2000 | Weissert ................ | B60J 5/0433 49/502 |
| 8,403,399 B2 | * | 3/2013 | Kuntze .................... | B60J 5/107 296/205 |
| 9,283,702 B2 | * | 3/2016 | Reese .................... | B60J 5/0481 |

(Continued)

FOREIGN PATENT DOCUMENTS

| | | |
|---|---|---|
| AT | 54360 B | 7/1912 |
| CN | 1427758 A | 7/2003 |

(Continued)

OTHER PUBLICATIONS

Chinese Search Report dated Aug. 8, 2023.

(Continued)

*Primary Examiner* — Pinel E Romain
(74) *Attorney, Agent, or Firm* — Dickinson Wright PLLC

(57) ABSTRACT

The invention relates to a vehicle door which comprises at least one support part of plastics material and at least two frame parts, wherein the frame parts are connected to one another by way of connection nodes, wherein the connection nodes are able to be produced by insert-moulding, wherein the support part of the same plastics material is simultaneously linked to the connection node.

16 Claims, 4 Drawing Sheets

(51) Int. Cl.
*B60J 5/10* (2006.01)
*B62D 33/023* (2006.01)

(56) References Cited

U.S. PATENT DOCUMENTS

| | | | | |
|---|---|---|---|---|
| 10,059,177 | B2* | 8/2018 | Demange | B60J 5/107 |
| 10,384,520 | B2* | 8/2019 | Kuntze | B60J 5/101 |
| 10,940,741 | B2* | 3/2021 | Jedinák | B60J 5/048 |
| 10,960,929 | B2* | 3/2021 | Czinger | B62D 21/17 |
| 2005/0155702 | A1* | 7/2005 | Ganz | B29C 66/742 |
| | | | | 156/272.4 |
| 2006/0145506 | A1* | 7/2006 | Braun | B29C 45/1704 |
| | | | | 296/70 |
| 2007/0222257 | A1* | 9/2007 | Flendrig | B60J 5/0447 |
| | | | | 296/146.6 |
| 2011/0158741 | A1* | 6/2011 | Knaebel | B62D 27/026 |
| | | | | 156/293 |
| 2011/0254311 | A1* | 10/2011 | Dajek | B60J 5/0484 |
| | | | | 296/146.5 |
| 2012/0048461 | A1* | 3/2012 | Ganz | B29C 66/91431 |
| | | | | 156/272.2 |
| 2012/0223517 | A1* | 9/2012 | Morrissey | A61M 39/12 |
| | | | | 285/125.1 |
| 2013/0057018 | A1 | 3/2013 | Reese | |
| 2017/0334148 | A1* | 11/2017 | Wexler | B29C 70/545 |
| 2019/0366813 | A1* | 12/2019 | Grond-Soons | B60J 5/107 |
| 2019/0375465 | A1* | 12/2019 | Coudron | B62D 29/043 |
| 2020/0282664 | A1* | 9/2020 | Funck | F16D 1/072 |
| 2021/0347235 | A1* | 11/2021 | Kuntze | B60J 5/107 |
| 2023/0001773 | A1* | 1/2023 | Hasl | B60J 5/10 |

FOREIGN PATENT DOCUMENTS

| | | |
|---|---|---|
| CN | 102235143 A | 11/2011 |
| DE | 10014332 A1 | 10/2001 |
| DE | 10022360 A1 | 11/2001 |
| DE | 10134697 A1 | 2/2003 |
| DE | 10134697 A1 | 2/2003 |
| DE | 102005011076 A1 | 9/2006 |
| DE | 102010014510 A1 | 10/2011 |
| EP | 1120305 A1 | 8/2001 |
| FR | 2908067 A1 | 5/2008 |
| WO | 2011124305 A1 | 10/2011 |

OTHER PUBLICATIONS

German Search Report from the German Patent and Trademark Officer for related German Application No. 102019216518.4 dated Jul. 3, 2020, 7 pages.

German Search Report from the German Patent Office for German Application No. 20198803.7 dated Mar. 16, 2021, 6 pages.

\* cited by examiner

VEHICLE DOOR AND PRODUCTION OF THE SAME

CROSS-REFERENCE TO RELATED APPLICATIONS

This application claims priority to German Patent Application Serial No. DE 102019216518.4 filed Oct. 25, 2019. The entire disclosure of the above application is incorporated herein by reference.

FIELD OF THE INVENTION

The invention relates to a vehicle door which comprises at least one support part of plastics material and at least two frame parts, wherein the frame parts are connected to one another by way of connection nodes.

The invention furthermore relates to a method for producing a vehicle door.

BACKGROUND OF THE INVENTION

This section provides information related to the present disclosure which is not necessarily prior art.

High requirements are set in terms of the endurance strength of a connection made from a metal tube and a plastics-material component in the automotive sector. This typically necessitates a special geometry of the metal tube in order for forces to be reliably transmitted, said special geometry being able to be implemented only by way of additional and cost-intensive process steps. The same applies to the method for producing doors or tail gates in the automotive industry. Plastics-material doors are usually reinforced by separately welded aluminium or steel reinforcement frames which are then joined to the inner part of the door as well as to be outer panel by adhesive bonding.

Such a door or a method of this type, respectively, can be derived as known from DE 100 22 360 A1, wherein a door support having at least one metal support element which can be configured in one piece or multiple pieces is provided, said metal support element being at least partially provided with plastics material. In the present case, the connection point of the respective one profile to the to the other profile herein is insert-moulded with plastics material so as to on account thereof establish a corresponding connection of the two components.

A vehicle door of which the metal support elements are partially provided with plastics material and are designed as internal high-pressure formed parts is known from WO 2011 124 305 A1. Following a bending process of the metal support element, the basic metal support element and inter alia the transverse metal support elements are inserted into the opened internal high-pressure forming injection-moulding tool. The closing of the tool then takes place, and respective internal high-pressure forming plungers at the ends of the basic metal support element move into the openings of the latter. On account of the internal high pressure, the profile is pushed against the cavity wall of the tool and said profile is imparted its final contour. The inserts—in particular the transverse metal support elements—are simultaneously connected in a form-fitting manner to the basic metal support element by hydroclinching.

After the process step of internal high-pressure forming, the plastics material for fastening further components is now injected in the same tool. The structural part, or the door support, respectively, can be retrieved from the tool after a cooling phase.

DE 10 2019 121 725, which has not been published, describes a connection of a metal tube and a plastics-material component, in particular for a vehicle, having a shape-imparting component which is disposed in a connection region, wherein the metal tube in the connection region has a shape which is adapted to the shape-imparting component. The connection is in particular a torsionally rigid connection. The invention moreover relates to a shape-imparting component for a connection of a metal tube and a plastics-material component, having a first portion for disposal in a connection region of the metal tube, wherein the first portion has a substantially cylindrical basic shape having at least one clearance which is disposed on a longitudinal side.

A composite part and a method for producing the same is known from DE 100 14 332 A1. A main body which is configured as a hollow profile herein is partially or completed encased with plastics material so as to establish a connection to a plastics-material component.

A branch for flexural lines is known from AT 54 360 B, wherein an external sheathing element of polymer encompasses the lines.

SUMMARY OF THE INVENTION

This section provides a general summary of the disclosure, and is not a comprehensive disclosure of its full scope or all of its features.

The invention is based on the object of achieving a vehicle door of which the reinforcement elements are produced from a composite of metal and plastics material.

A vehicle door herein is to be understood to be a normal door as well as a tailgate.

The object is achieved by a vehicle door which comprises at least one support part of plastics material and at least two frame parts, wherein the frame parts are connected to one another by way of connection nodes, wherein the connection nodes are able to be produced by insert-moulding, wherein the support part of the same plastics material is simultaneously linked to the connection node.

The vehicle door according to the invention can be produced by an injection-moulding procedure, wherein the plastics-material components of the support part as well as of the connection nodes are simultaneously injection-moulded.

It is advantageous herein that the connection node is constructed from metal tubes and inserts which are plugged into the latter and have recesses, wherein the metal tube when insert-moulding collapses in the direction toward the insert.

Very positive mutual linking between the metal tubes can be produced by this method since undercuts which represent an axial safeguard arise on account thereof.

In order for every type of potential connection to be able to be produced it is advantageous that the insert has two or more legs for plugging into in each case one metal tube.

The angle between the legs herein is between 180° and 30°.

The insert-moulding of the connection node is partially represented by the support part. This means that the sleeve-shape insert-moulding of the connection node takes place only on that side that faces away from the support part, while the region disposed on or in the support part is formed by the material of the support part.

The method according to the invention comprises the following steps:

placing the insert into the metal tubes; and inserting the frame configured with insets at the connection nodes into an injection-moulding tool;

insert-moulding the connection nodes, wherein the metal tube in the connection region is formed in such a manner that said metal tube has a shape which is adapted to the insert;

simultaneously injection-moulding the support part.

The method according to the invention implements a very simple manner of reinforcing the frame structures as well as producing a plastics-material support part by an injection-moulding procedure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
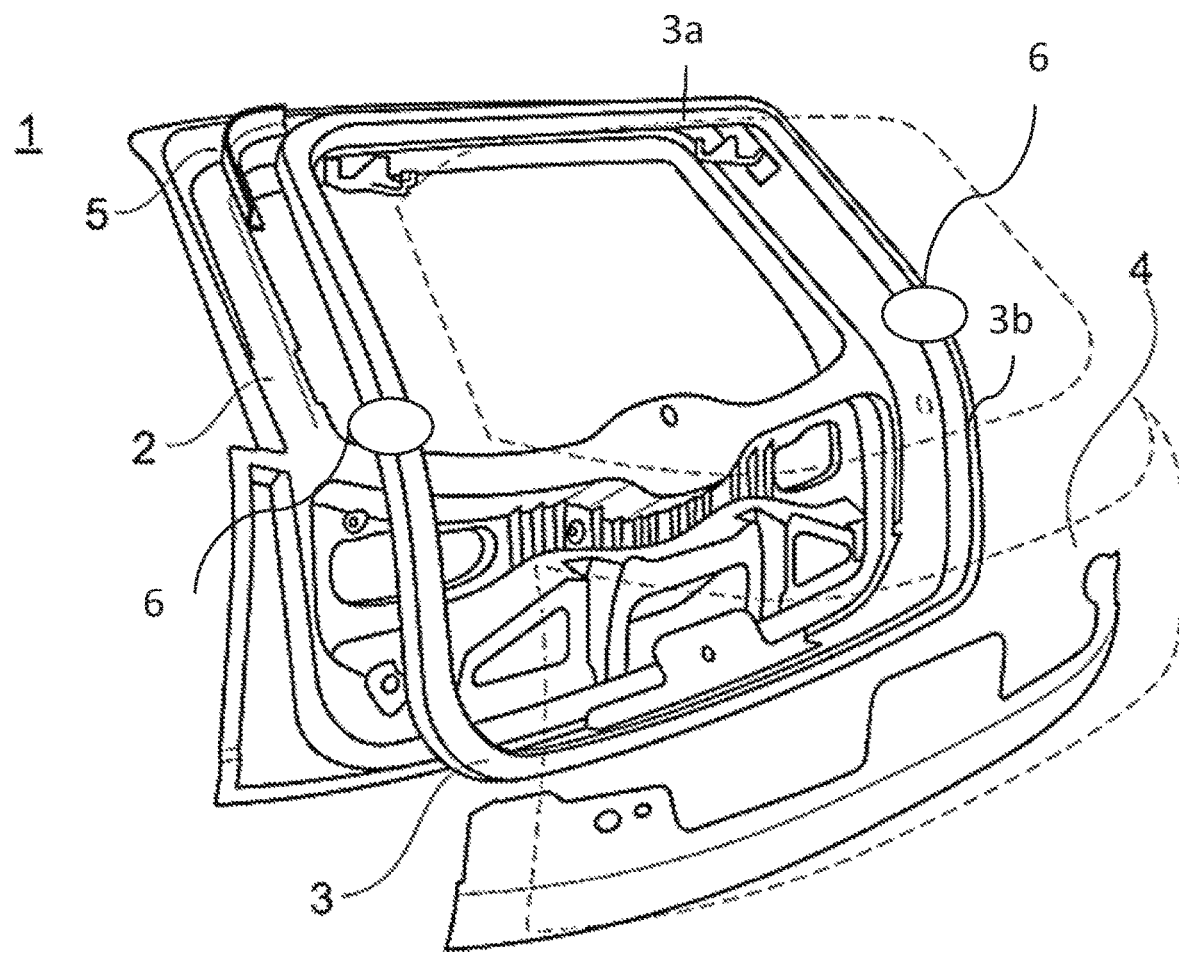
FIG. 1 shows an exemplary tailgate.

The main components of a vehicle door 1, of a tailgate, are illustrated in FIG. 1. A support 2 part which is produced from fibre-reinforced plastics materials serves as the base of the vehicle door. The reinforcing frame 3 is either a closed shape or else a non-closed, arbitrary shape of metal or plastics materials. The cladding parts 4 are connected to the support part 2. Reinforcement elements 5 which in this exemplary embodiment are produced from metal are provided for reinforcing the vehicle door 1, i.e. the tail gate.

Such a frame 3 in the solution according to the invention is produced from individual frame parts 3a, 3b by way of connection nodes 6. Two frame parts 3a and 3b of the frame 3 are present in the example illustrated; a construction from a multiplicity of frame parts is however also possible. In the method for producing a fixed connection, the frame parts which are composed of metal tubes are provided with a metallic insert; this will be described in yet more detail by means of FIG. 3.

Figure 2:
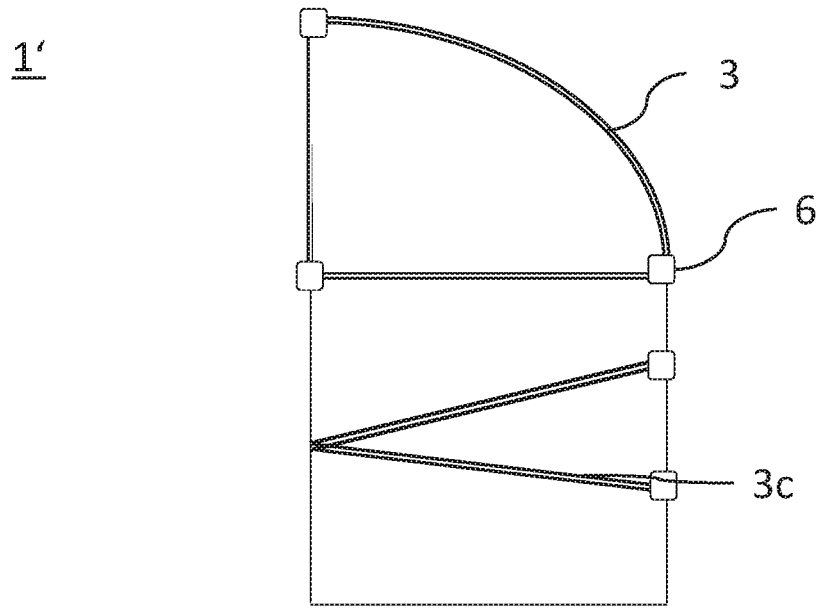
FIG. 2 shows a schematic vehicle door.

A schematic side door 1' having the frame 3 thereof is illustrated in FIG. 2. Such a side door has an inner cladding which is of plastics material and which is connected to the frame and the outer skin of the side door. In addition to the embodiment of the tail gate, this frame 3 for side-impact protection also contains reinforcement elements which are configured as frame parts 3c. The metallic frame parts of the frame 3 are connected at the connection nodes 6.

Figure 3:
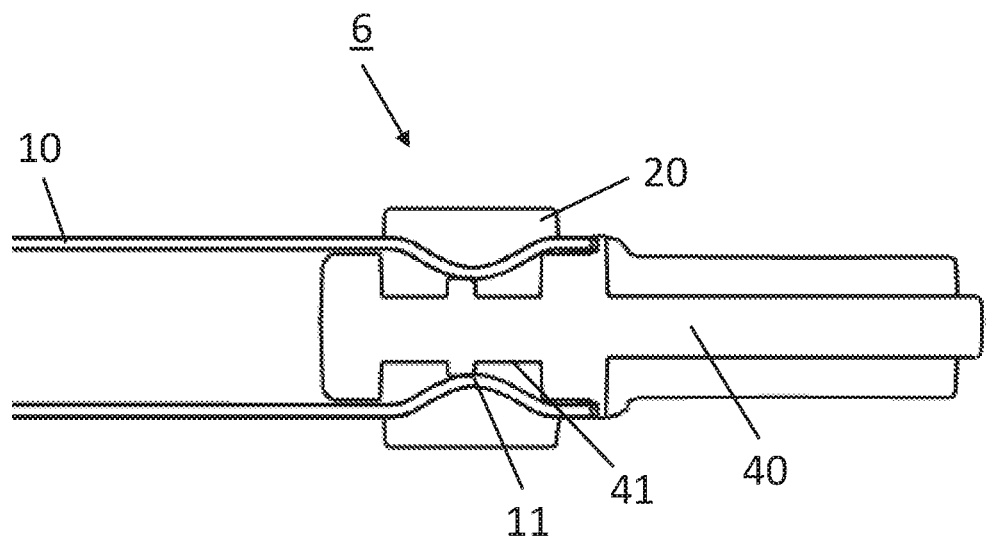
FIG. 3 shows a schematic sectional illustration of an exemplary connection.
Figure 5:
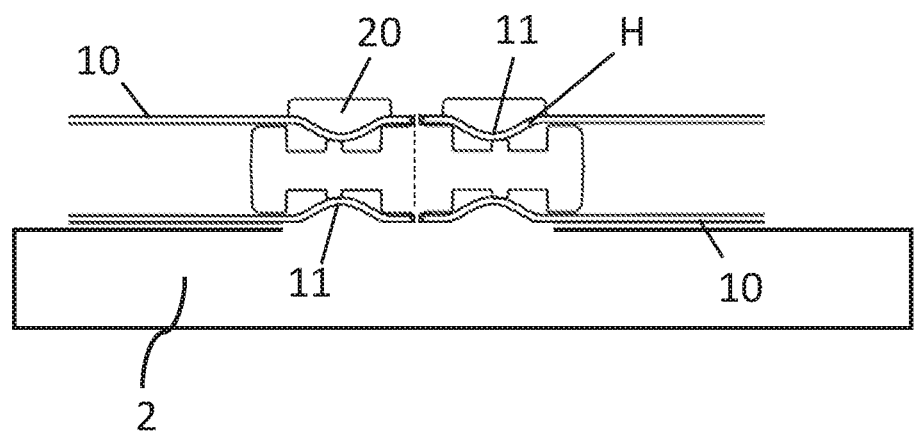

A connection node 6 on a metal tube 10 is shown in FIG. 3, specifically after the connection using the injection-moulding method according to DE 10 2019 121 725 A1 has already been completed. The metal tube 10 is a commercially available metal tube which can first be brought to the desired shape and/or the desired cross section. In this example shown, an insert 40 is connected to the metal tube 10, said insert 40 in this example being a shaft of metal. It is important herein that the insert 40 has a structure having a recess 41 which in the radius is offset toward the inside and which serves as an undercut region H in the subsequent connection process. The insert 40 has an external diameter which corresponds to approximately the internal diameter of the metal tube. The insert at one side or at both sides moreover terminates in a cylindrical region which serves for facilitating the introduction of the insert into the metal tube. In the connection of two metal tubes as shown in FIGS. 5 and 6, the insert 40 serves as an internal guide for and for positioning the two metal tubes which both terminate in a butt joint.

Such an insert 40 herein has recesses 41 which serve in each case for fastening one of the two metal tubes 10. The recesses 41 are distributed radially on the insert 40; for example, these are four recesses 41 which are distributed uniformly across the radius.

Figure 6:
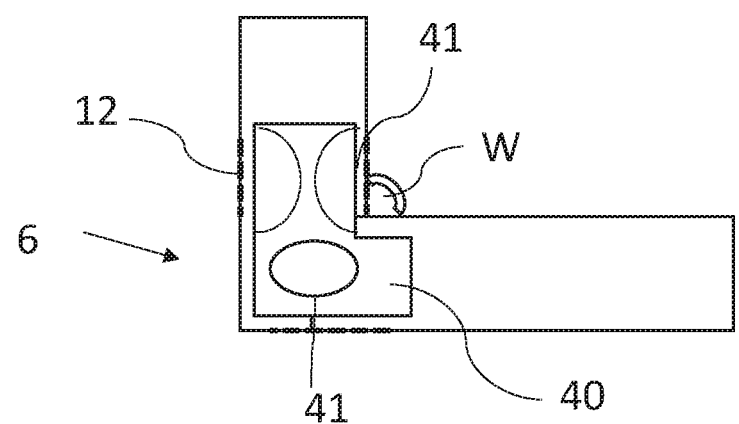
FIG. 6 shows a variant of a corner.

The insert 40 shown in FIG. 6 is composed of an L-shaped component and on both legs thereof has recesses 41 which are disposed so as to be mutually perpendicular.

The metal tubes 10 as the frame 3 are inserted into the injection-moulding tool for the support part of the tail gate 1 or the internal cladding of the vehicle door 1', so as to be loosely connected by way of the insert 40.

In order for the connection node 6 between the individual metal tubes 10 to be configured, the injection-moulding tool 50a, 50b has a structure which is adapted and corresponds to the shape 20 of the connection node 6 to be produced.

Figure 4:
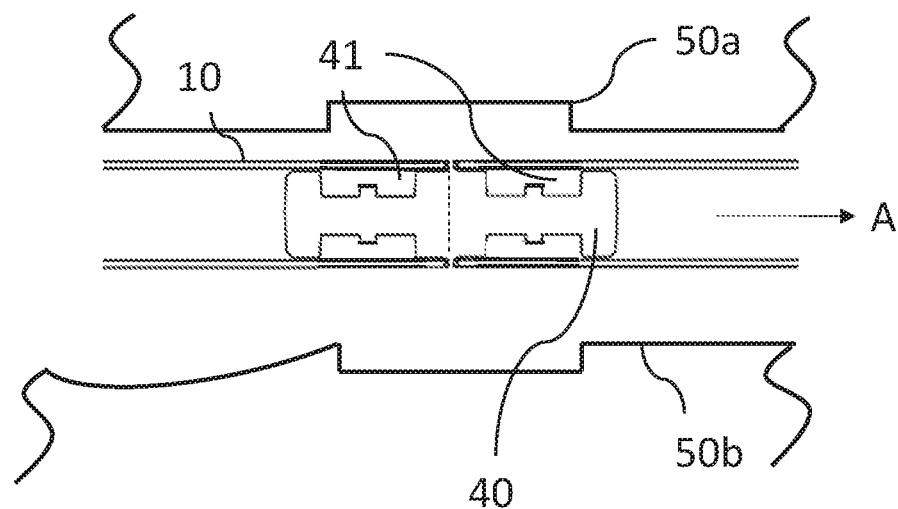
FIGS. 4 and 5 show a tube-to-tube connection using an injection-moulding tool.

An injection-moulding tool of which the components are disposed above and below the metal tubes is indicated in FIG. 4. The injection-moulding tool is shaped for the support part and additionally for the configuration of the connection nodes.

During the injection-moulding process for the support part 2 or the inner cladding, each metal tube 10 at the connection node 6 is formed by the injection pressure in such a manner that said metal tube 10 has a shape which is adapted to the insert 40. The forming of the metal tube 10 takes place by the pressure of the injection-moulding process, said pressure being between 300 bar and 600 bar. On account of the pressure, the metal tube at the recesses 41 of the insert is indented in the direction of the centre of the tube, wherein the plastics material configures a sleeve-type shape 20. In order for this pressure to be achieved at the connection nodes, the plastics material has to be injected into the tool at the connection nodes.

The taper 11 of the metal tube 10 that is created in the region of the recesses 41 of the insert 40 is illustrated in FIG. 3 or 5. On account of the pressure of the injected plastics material, the metal tube 10 collapses in the direction towards the insert 40.

The sleeve, or shape 20, respectively, formed by the insert-moulding engages in the recesses 41 in such a manner that the taper 11 in the axial direction A forms an undercut for the plastics material.

The support part 2 is connected to the connection node 6 by way of the undercut region H.

FIG. 6 shows a corner connection in which the insert has an L-shaped form. The recesses of the insert are schematically illustrated. Said recesses are mutually perpendicular and axially offset. The regions 12 of the metal tube in the injection-moulding procedure collapse in the direction towards the insert.

Connection nodes for a plurality of metal tubes are likewise implementable. The insert here in this instance has to be formed in a corresponding manner.

LIST OF REFERENCE SIGNS

1 Vehicle door
2 Support part
3 Frame
3a, 3b, 3c Frame parts
4 Cladding parts
5 Reinforcement elements
6 Connection nodes
10 Metal tube
11 Taper
12 Region of the metal tube
20 Shape
40 Insert
41 Recess
50a, 50b Injection-moulding tool
H Undercut region

What is claimed is:

1. A vehicle door, comprising: at least one support part of a plastic material and at least two frame parts, wherein the frame parts are connected to one another by way of at least one connection node, wherein the connection node is constructed from at least two metal tubes and at least one insert which is plugged into the metal tubes and has at least one recess, wherein the metal tubes collapse toward the at least one recess of the at least one insert during an insert moulding process, and wherein the insert moulding process of the connection node also includes insert moulding of the support part.

2. The vehicle door according to claim 1, wherein the at least one insert has two or more legs each for being plugged into one of the metal tubes.

3. The vehicle door according to claim 2, wherein an angle between the legs is between 180° and 30°.

4. A vehicle door, comprising:
   a support part;
   a reinforcement frame adapted to be secured to the support part and including a first metal tube frame part and a second metal tube frame part; and
   a connection node for interconnecting the first and second metal tube frame parts, the connection node including an insert having a first leg inserted into the first metal tube frame part, a second leg inserted into the second metal tube frame part, and at least one recess formed between the first and second legs, wherein an insert moulding process causes portions of the first and second metal tube frame parts to collapse inwardly into the at least one recess to define a first collapsed portion of the first metal tube frame part and a second collapsed portion of the second metal tube frame part, and wherein the insert moulding process subsequently forms at least one sleeve which at least partially surrounds at least one of the first and second collapsed portions of the first and second metal tube frame parts.

5. The vehicle door according to claim 4, wherein the support part is linked to the connection node via the insert moulding process.

6. The vehicle door according to claim 4, wherein the first leg of the insert is press-fit into the first metal tube frame part and the second leg of the insert is press-fit into the second metal tube frame part to define a butt joint, and wherein the insert further includes a third leg located between the first and second legs and which is press-fit into both of the first and second metal tube frame parts at the butt joint.

7. The vehicle door according to claim 6, wherein the at least one recess includes a first recess located between the first and third legs of the insert and a second recess located between the second and third legs of the insert, and wherein the at least one sleeve includes a first sleeve at least partially surrounding the first collapsed portion of the first metal tube frame part and which extends into the first recess, and a second sleeve at least partially surrounding the second collapsed portion of the second metal tube frame part and which extends into the second recess.

8. The vehicle door according to claim 7, wherein the insert moulding process of the connection node also includes insert moulding of the support part.

9. The vehicle door according to claim 4, wherein the insert moulding process of the connection node also includes insert moulding of the support part, and wherein the support part and the at least one sleeve of the connection node are formed from the same plastic material.

10. The vehicle door according to claim 4, wherein the at least one recess formed in the insert defines a first recess and a second recess, wherein the first recess receives and retains the first collapsed portion of the first metal tube frame part and the second recess receives and retains the second collapsed portion of the second metal tube frame part.

11. The vehicle door according to claim 10, wherein the at least one sleeve includes a first sleeve and a second sleeve, wherein the first sleeve at least partially surrounds the first collapsed portion of the first metal tube frame part and extends into the first recess, and wherein the second sleeve at least partially surrounds the second collapsed portion of the second metal tube frame part and extends into the second recess.

12. The vehicle door according to claim 4, wherein the first metal tube frame part is U-shaped and has first and second terminal end portions, wherein the second metal tube frame part is U-shaped and has first and second terminal end portions, wherein the connection node includes a first connection node interconnecting the first terminal end portions and a second connection node interconnecting the second terminal end portions.

13. A vehicle door comprising:
   a plastic support part;
   a reinforcement frame having a first metal frame part and a second metal frame part; and
   a connection node interconnecting the reinforcement frame to the plastic support part, the connection node including an insert defining a first recess and a second recess, the insert being plugged into end portions of the first and second metal frame parts to define a butt joint therebetween,
   wherein the end portion of the first metal frame part is deformed inwardly to extend into the first recess and define a first deformed end portion and the end portion of the second metal frame part is deformed inwardly to extend into the second recess and define a second deformed end portion,
   wherein the connection node includes a plastic sleeve-shaped part which at least partially surrounds at least one of the first and second recesses for connecting the first and second metal frame parts together, and
   wherein the connection node provides a connection between the plastic support part and the first and second deformed end portions of the first and second metal frame parts.

14. The vehicle door according to claim 13, wherein an insert moulding process is used to deform the first and second deformed end portions of the first and second metal frame parts and subsequently mould the plastic sleeve-shaped part.

15. The vehicle door according to claim 14, wherein the connection between the plastic support part and the first and second deformed end portions of the first and second metal frame parts is a moulded connection made via the insert moulding process.

16. A vehicle door comprising at least one support part of a plastic material and at least two frame parts, wherein the frame parts are connected to one another by way of at least one connection node, wherein the connection node is constructed format least two metal tubes and at least one insert which is plugged into the metal tubes and has at least one recess, wherein the metal tubes collapse toward the at least one recess of the at least one insert during an insert moulding process, and wherein the at least one insert has two or more legs each for being plugged one of the metal tubes.

* * * * *